Patented Dec. 7, 1948

2,455,758

UNITED STATES PATENT OFFICE 2,455,758

METHOD OF PREPARING A MINERAL BINDER

Herbert Hans Greger, Washington, D. C.

No Drawing. Application December 10, 1941, Serial No. 422,460

1 Claim. (Cl. 106—85)

This invention relates to mineral binder compositions and more particularly to binders comprising phosphatic or arsenious materials.

The use of phosphatic materials in the field of mineral binders has been contemplated for many years. The principal compositions employed in the past have consisted of either phosphoric acid or solutions of certain metallic phosphates in phosphoric acid. These compositions have proved to be unsatisfactory in many respects. The binding methods employed phosphoric acid alone depend entirely upon a reaction between the acid and the material being bonded for the formation of the binder. This method is ordinarily used in binding oxides, hydroxides, a basic phosphate or silicate and finds its most frequent application in the formation of dental cements, rammed furnace linings and refractories as well as in the binding of adsorbent articles from finely divided waste bauxite. The phosphoric acid reacts with the basic material for example, aluminium hydrate, forming aluminum phosphate. In most cases there is a large excess of the hydrate present, but usually chemical hardening and the formation of insoluble oxy-phosphates proceeds slowly, unless heat is applied.

The second type of binder previously employed comprises a solution of a phosphate of aluminum, iron, zinc, lead, tin, magnesium or other metal in phosphoric acid. These binders are very acidic and hence are unfit for many purposes. In order to set and render them insoluble it is necessary that they be reacted with a base, in which respect they are similar to the phosphoric acid binders discussed above. The setting process in this case is even slower than in the case when phosphoric acid alone is used which may be due to the elimination of the initial intensive reaction from the mixture.

The phosphoric acid solutions of metal oxides are stable at room temperature and in certain instances remain in a liquid state even though the requisite amount of base in granular form is present for the purpose of neutralizing the acid. The application of heat, however, precipitates acid insoluble phosphates which cannot be redissolved, as in accelerated setting processes. For example, finely divided bauxite was digested at slightly above room temperature with sufficient 35% phosphoric acid to form the di-basic aluminum phosphate. The solution was dilute enough to prevent the formation of a tacky condition and the undissolved solids were removed therefrom by filtration in a vacuum and perforate basket centrifuge or by clarification in a solid basket centrifuge. Since the residual solids were very finely divided, neither of these methods was very satisfactory. A large amount of the solution was retained in the cake and unless the solution is very acid it cannot be recovered by washing due to hydrolysis of the aluminum phosphate. A certain amount of clear solution was obtained and an attempt was made to concentrate it by heating slowly at temperatures around 80° C. However, appreciable amounts of precipitate appeared which did not re-dissolve in the liquid. The characteristics exemplified by the foregoing procedure constitute a serious objection since they preclude the production of clear dilute acidic phosphate solutions and the concentration of these solutions by heat.

It is the principal object of this invention to provide a viscous tacky mineral binder capable of being rapidly solidified either by chemical hardening or by drying.

Another object of this invention is to provide a concentrated, clear liquid mineral binder.

Still another object of this invention is to provide a mineral binder containing phosphatic or arsenious materials and a different inorganic or organic acid radical.

A further object of this invention is to provide a mineral binder containing phosphatic or arsenious materials and a different inorganic or organic acid radical capable of being rendered inactive during chemical hardening of the binder.

A still further object of this invention is to provide a mineral binder system comprising a phosphatic or arsenious substance and a different inorganic or organic acid radical capable of being removed from the system during heating to set the binder.

This invention is primarily directed to compositions containing the phosphates and arsenates of trivalent metals such as aluminum, iron and nickel. Under suitable conditions of water content, composition and mode of production, these compounds form viscous, tacky adhesive solutions which may be transformed into solids either by chemical reaction or by drying. The property of tackiness is important in that it provides a good wet strength in a molded article and facilitates handling. This invention also contemplates solid compositions comprising trivalent metal phosphates which may be dissolved in water to produce viscous, tacky, adhesive binders. The invention further contemplates binders obtained from a mixture of dry ingredients either by steaming the dry mixture or by utilizing the water of crystallization of the ingredients of the dry mixture to carry out the desired reaction.

The fundamental departure from previous compositions of this general type resides in the introduction into the system of other acid radicals such as the sulphate, chloride or nitrate radicals, either as an acid or as a salt of the metals in the binder. Organic acid radicals may be employed with equivalent results, though their use is especially adapted for certain specific applications. These acid radicals perform certain definite functions in the binder system and having performed that function may be rendered inactive during the chemical hardening process or eliminated from the system entirely during setting to provide a metallic phosphate or arsenate binder. The compositions of this invention and their mode of preparation fall within certain well defined groups which will now be considered specifically.

TYPE I

The compositions of this group are systems comprising trivalent metals, a phosphate radical and an acid radical of a different inorganic acid or an organic acid. They may be prepared by dissolving a phosphate of a trivalent metal such as aluminum in sulfuric, hydrochloric, nitric or other suitable inorganic or organic acid. The same result may be obtained by dissolving the trivalent metal salts of these acids such as the aluminum salts in phosphoric acid. In either of these methods excellent viscous tacky binder solutions are obtained.

In the case of aluminum phosphate it is interesting to note that this compound does not decompose at calcining temperatures of 1000° C. while the aluminum salts of other acids decompose readily at lower temperatures. The decomposition temperature of aluminum sulfate for example, takes place at temperatures of around 750° C. Thus a binder composition obtained by dissolving aluminum phosphate in sulfuric acid may be calcined to drive off the sulfate radical and leave a residue having the same composition as the initial aluminum phosphate from which the binder was prepared. A binder of this particular type is very acidic but may be used to advantage in cases where the final product undergoes a process of calcination.

Generally binders of this type may be produced from bauxite, phosphoric and hydrochloric or other acids, such as for example sulfuric or nitric in place of the hydrochloric acid. Their production from aluminum chloride and phosphoric acid and aluminum phosphate and hydrochloric acid has proved to be simple and economical. In the presence of chloride, sulfate or nitrate ions in the form of their acids and salts, aluminum phosphate solutions are obtained which may be diluted in any proportion without hydrolysis or which after dilution may be concentrated by heating without precipitation of insoluble material.

*Example 1*

In one instance, bauxite was treated first with hydrochloric acid to form aluminum chloride and the dilute solution obtained was freed from insoluble suspended matter by decantation. Phosphoric acid was then added to the solution in an amount sufficient to form ortho-phosphate. The solution thus obtained was concentrated by heating and during this process the temperature rose gradually and hydrochloric acid gas is evolved and driven off. The evolution of the gas continues as the heating is continued. Sufficient acid remains in the solution to accomplish the desired result even though the heating is continued until the solution temperature rises to nearly about 150° C. If the heating is interrupted at between 125–130° C. and the solution allowed to cool, a very tacky and viscous liquid was obtained. However, when the heating was continued to nearly about 150° C., the solution upon cooling formed a hygroscopic solid which could be readily dissolved in water without hydrolysis.

The binder thus obtained was excellent and in agglomerating and molding calcined fuller's earth it proved to be the most satisfactory phosphate developed so far.

TYPE II

The compositions falling within this class are relatively neutral in character and hence are not limited in their application. These compositions comprise aqueous solutions of trivalent metal phosphates and trivalent metal salts of sulfuric, hydrochloric, nitric or other inorganic or organic acids. Trivalent metal phosphates as for example aluminum phosphate may be dissolved in an aqueous medium along with aluminum salts of acids such as sulfuric, hydrochloric or nitric acids. The latter salts increase the solubility of aluminum phosphate.

As stated above, the phosphate of a trivalent metal may be dissolved in the presence of a soluble organic acid salt of a trivalent metal. The use of organic acid salts is limited owing to their cost and the fact that they are somewhat less effective in their action. Their principal application is in connection with binders which consist in part of organic solvents.

The setting or transformation of these compositions may be conducted by calcining as set forth in the previous group. During the calcining step the sulfate, chloride or nitrate salts of aluminum are decomposed and a residue obtained which consists of basic phosphates as distinguished from the neutral phosphates obtained by the calcining process set forth in the previous group.

Owing to the relatively neutral characteristics of this group of compositions, it is possible to transform them into solids by means of chemical hardening without employing excessive amounts of basic materials. This setting process is carried out by adding to the solution a relatively small quantity of a suitable basic substance as for example an oxide, phosphate or silicate which is capable of reacting with the binder to form an oxy-salt. The basic substance employed need not necessarily be an aluminum salt for salts of calcium, magnesium, zinc and lead may be used to effect the same result. A composition comprising an aluminum phosphate dissolved in the presence of aluminum sulfate may be reacted with a calcium or barium silicate to form an insoluble alkaline earth sulfate and a basic aluminum phosphate. Thus the sulfate radical will be rendered inactive and the composition effectively hardened.

*Example 2*

The solubilizing characteristics of aluminum sulfate, chloride and nitrate are exemplified by the following procedure. One mol. or slightly less of aluminum chloride effectively dissolves one mol. of aluminum phosphate in an aqueous medium. The solution thus obtained may be heated and concentrated. Upon cooling, a viscous tacky clear solution is obtained which may be diluted with water in any proportion without spontaneous precipitation of solids due to hydrolysis. The solution may be further dehydrated by heating to above 100° C. and if the heating is continued until the temperature of the solution increases to somewhat below 150° C. a stable glassy solid is obtained upon cooling which may be redissolved in water.

The binders of this group may be produced from mixtures of the respective acids as for example a mixture of phosphoric and hydrochloric acids may be employed in treating a base such as aluminum hydrate or bauxite.

Type III

The compositions comprising this group are analogous to those of the preceding group in that they are relatively neutral and hence require the use of only small amounts of insolubilizing basic materials such as oxides, during chemical hardening or setting of the binder. These compositions are prepared from trivalent metal salts of inorganic or organic acids such as aluminium or ferric sulfates, nitrates or chlorides and a divalent metal phosphate such as calcium phosphates and zinc phosphates. Care must be exercised to select trivalent metal salts and divalent metal phosphates which provide ions in a liquid phase that have the ability to form complex colloidal compounds that remain as such and do not crystallize. The compositions comprising this group may be prepared either by dissolving the various ingredients in an aqueous medium or, under certain conditions, by merely mixing the dry ingredients. These binders possess all of the beneficial characteristics of those in the preceding group as well as the additional advantage that better control may be exercised during their preparation; as for example, their acidity may be controlled very simply according to this method.

Example 3

One mol. of aluminum sulfate and two mols. of di-basic calcium phosphate were dissolved in an aqueous medium and heated. A viscous tacky liquid was obtained which contained a very finely divided white precipitate consisting mostly of sulphate, but which may also contain complex salts formed by the sulphate and phosphate radicals. This precipitate may be left in the binder or removed from the solution of compounds formed from alum and the phosphate and sulphate radicals such as aluminum phosphate, or sulphate or complex phosphate and sulphate salts of alum, by known methods such as decantation. The clear liquid thus obtained may be concentrated by heating without precipitation of solids owing to the presence of the sulfate ion. Upon evaporation at water bath temperatures, a glassy solid is obtained which may be redissolved without substantial hydrolysis.

The formation of the white precipitate in the above reaction may favor the production of the tacky condition. It appears, however, that the reaction of zinc phosphate and aluminum sulfate also produces tacky binders. It is, therefore, not generally true that the divalent metal ion and the sulfate ion have to be eliminated from the solution to obtain this property. It is more important that these ions in the liquid binder be capable of forming complex, colloidal type solutions which exhibit an ability to remain in this condition without crystallizing. In contrast to the binder prepared from zinc phosphate and aluminum sulfate, the reaction products of magnesium phosphate and aluminum sulfate tend to crystallize.

In the foregoing example, the aluminum sulfate and di-basic calcium phosphate were first mixed together in a dry state and then dissolved in about one liter of water. The solution thus obtained, while viscous and tacky was found to contain small lumps as well as to be granular. In order to overcome this objection the several ingredients were dissolved separately in water and the solutions obtained were then mixed together. The di-basic calcium phosphate formed a slurry in water and was added to the aluminium sulfate solution while stirring rapidly. This procedure eliminated the lumpy condition but required large amounts of water; as for example four to five liters as compared to approximately one liter which was used when the mixture of dry ingredients was dissolved in water. Accordingly, the method of employing hot solutions of the several ingredients was investigated. A hot aqueous slurry of di-basic calcium phosphate was added to a hot solution of aluminum sulfate with agitation. A viscous tacky solution free from lumps was obtained and the amount of water employed varied from only one-half to one liter. Various proportions of the aluminum sulfate and di-basic calcium sulfate were employed in the foregoing methods, the proportions however, always being in the ratio of gram molecular weights or fractions of molecular weights of the components. The results obtained in each instance were similar.

Example 4

In preparing these compositions from crude commercial materials the following composition is typical. A mixture of the following ingredients was prepared, Pebble rock containing 25% $Ca_3(PO_4)_2$
  ------grams-- 1240
Sulphuric acid 93% pure containing 25% water ------grams-- 453
Bauxite containing 50% $Al_2O_3$ ----do---- 204
Water ------cc---- 200

After the materials had reacted, the mixture was allowed to stand and the insoluble material which settled out was removed and discarded. About four hundred twenty-six grams of tacky material were recovered which analyzed as follows,

| | |
|---|---|
| CaO | 1.00 |
| MgO | 0.5 |
| $Al_2O_3$ | 18.00 |
| $Fe_2O_3$ | 3.00 |
| $PO_4$ | 48.00 |
| $SO_4$ | 30.00 |
| $NO_3$ | 00.03 |
| $TiO_2$ | 00.10 |
| $V_2O_5$ | 00.05 |
| $SiO_2$ | 00.10 |
| MnO | 00.05 |

Allowing for water and impurities, it is calculated that the percentage recovery of the main ingredients is as follows,

| | Per cent recovery |
|---|---|
| Iron and aluminum | 50 |
| Sulphate | 18 |
| Phosphate | 60 |

These recoveries may be readily further improved. The low sulphate recovery is due to the fact that the greater proportion of acid reacts with the lime to form insoluble sulphates which are removed with other insoluble matter.

A further and very satisfactory method of preparing the compositions of this group was carried out by mixing the aluminum sulfate and di-basic calcium phosphate in a dry state in a ball mill. The finely divided homogeneous dry mixture was then exposed to live steam for a few minutes. The moisture and heat of the steam promoted the reaction and brought about a tacky, sticky condition in the mass. The mass is then cooled and solidified and may be shipped in a highly concentrated form. A viscous tacky binder solution may be formed from this product merely by dissolving it in water.

When the binders of this group are intended to undergo calcination, the above methods may be modified by introducing either the phosphate or other acid radical in the form of an ammonium salt. During calcination this salt is decomposed, leaving as the residue the stable components of the bond.

The materials of this class are especially applicable in bonding wood fiber, mineral matter such as feldspar and asbestos as well as in modifying the properties of clays. The binder is neutral enough to prevent the destruction of chrysotile by acid decomposition and by a simple drying operation a well bonded, water resistant product may be obtained from this asbestos. As a variation the binder may be produced in place by mixing the ingredients with the material to be bonded and subsequently steaming or otherwise heating the entire composition under pressure.

For example, different binders prepared from different molecular ratios of aluminum sulfate and calcium acid phosphate were sprayed on asbestos and the asbestos was then molded into briquettes under a pressure of ten thousand pounds per square inch and heated in an oven to 250° C. A firm well bonded product was obtained. In some cases a waterproofing agent such as red lead was mixed and ball milled with the dry asbestos. A typical composition employed in bonding asbestos in the foregoing manner appears as follows, $Al_2(SO_4)_3.14\frac{1}{2}H_2O$ _____grams__ 603
$CaHPO_4$ _____do____ 272
Water _____cc___ 500

The investigation of the foregoing type of bond provided an even broader concept of the compositions falling within this group. It has been determined that certain metallic salts of inorganic acids exist as hydrates in which the degree of hydration is sufficient to dissolve and liquefy the salt under certain conditions of temperature and pressure at which the water of crystallization is released from the crystal lattice. The metallic salts thus dissolved in their own water of crystallization will react with the phosphatic material to form the binders herein disclosed. The temperatures and pressures at which the hydrated metallic salts dissolve vary with the degree of hydration. For example, aluminum sulfate containing 18 mols. of water will melt in its own water of crystallization at 85° C. and in this form will react with calcium phosphate to produce an excellent binder. By adding such basic materials as barium carbonate or lead oxide which act as insolubilizers in that they react to form water insoluble sulfates, it is possible to obtain fully insoluble reaction products as well as assist in the process of hardening or setting of the phosphate by the formation of oxy-phosphate. This was verified by experimental work in bonding asbestos with a mixture of a hydrated aluminum sulfate, a calcium phosphate, such as mono or dicalcium phosphate or calcium meta phosphate and an insolubilizer for the sulfate radical such as barium carbonate or lead oxide. Upon applying heat and pressure, the hydrated salt liquefied and the reaction took place forming a non-porous strong bond. In the presence of readily decomposed silicates or hydrated silica a certain amount of silica phosphate may form. For example, such reactions may take place when magnesium silicate (serpentine), readily reacting aluminum silicates such as clays, hydrated silica (opal) or diatomaceous earth are present.

The basic or acidic phosphates, meta phosphates or pyrophosphates may be used and their degree of acidity may be modified by the addition of sulphuric phosphoric or other suitable acids, before reaction with aluminum, iron or other metallic sulphate.

It has been ascertained that in place of hydrated aluminum sulfate, hydrated salts in general may be employed which are capable of dissolving in their own water of crystallization and in solution will react with other compounds to form a temporarily plastic or fluid substance which further reacts and solidifies to form water resistant and insoluble materials. For example, various other salts may be employed such as ferric sulfate, aluminum chloride, ferric chloride, magnesium sulfate, magnesium chloride and zinc sulfate. These salts may be compounded with phosphates or other substances which will react to form insoluble sulfates or chlorides such as oxy-chlorides. There is no particular limitation on the temperature at which the foregoing reactions are carried out since, as has been previously pointed out, the phosphates are stable at quite high temperatures. Ordinarily the reaction is conducted under pressures of about 10,000 pounds per square inch and at temperatures ranging from the liquefying point of aluminum sulfate (85° C.) to about 250° C. If conditions require it, the liquefying temperature may be reduced by the introduction of steam or a minor proportion of water.

*Example 5*

A test of the binder in bonding asbestos was carried out as follows. The following dry mixture was ball milled.

| | Per cent by weight |
|---|---|
| Asbestos | 30 |
| Aluminum sulfate and calcium phosphate | 50 |
| Barium carbonate | 20 |

The mixture of sulfate and phosphate was prepared in molar ratio or 603 grams of sulfate containing 14.5 mols. of water and 272 grams of phosphate. To this mixture may be added barium carbonate, lead oxide or other modifying ingredients such as finely ground phosphate rock, copper ferrite, magnesium oxide, fly ash, ferric oxide, zinc oxide, Portland cement, talc and aluminum oxide. The ball milled mixture is thereupon heated and pressed to liquefy the hydrated salt and carry out the reaction whereby a water insoluble binder is formed.

Another binder composition which has been found to be very satisfactory was prepared by mixing equimolecular quantities of aluminum sulphate and the mono calcium phosphate as follows.

| | Parts by weight |
|---|---|
| $Al_2(SO_4)_3.18H_2O$ | 666 |
| $Ca(H_2PO_4)_2.H_2O$ | 252 |

In the above binders the mono and di-calcium phosphates may be replaced by the superphosphates as, for example triple superphosphate.

TYPE IV

The compositions comprising this group represent a further modification of the method of preparing binders of a neutral character as set forth in the two preceding groups. The compositions herein comprise colloidal aluminum phosphate solutions from which all soluble salts have been removed by dialysis. In preparing these solutions alum and sodium or ammonium phosphate are employed. A 5% solution of aluminum chloride is employed to which equal volumes of a 10% solution of dibasic ammonium phosphate and aqueous ammonia are added until the solution is faintly ammoniacal. The crystalloids are removed by dialysis and a solution obtained which is neutral and functions satisfactorily as a binder.

TYPE V

The compositions of this group are primarily directed to the use of arsenates in place of phosphates and are of great importance.

The ready reduction of the arsenates at relatively low temperatures and the formation of arsenous oxide during calcination which is accompanied by volatilization of the acid radical in many instances leaves a pure or almost pure oxide bond. In contrast to the phosphatic type of binders in which reduction takes place only at temperatures above 1300° C. and under severe reducing conditions the reduction of the arsenates is accomplished at relatively moderate temperatures. These binders are adapted for use in specialized fields where a pure oxide bond is desirable as in the case of bonding catalyst masses.

The raw material sources for the commercial preparation of the foregoing types of binders comprise the large phosphate rock, sulphur and bauxite deposits in this country. Thus the most direct and simple approach to the preparation of the compositions herein comprising the treatment of phosphate rock concentrate and bauxite with sulphuric acid is assured. The utilization of aluminum and iron phosphate and arsenate minerals as raw materials such as lazulite, wavellite, variscite, scorodite, dufrenite and strengite may be of interest though these minerals are not available at present in commercial quantities. Hembrock clay, which is the residue from the production of Florida phosphate rock, contains some wavellite. However, this is so finely divided and so intimately mixed with the clay that it is difficult to separate it by flotation or other commercial separating methods. Leaching with acid or sulphate, chloride or nitrate solutions followed by sedimentation and washing of the solid residue may prove to be a feasible method for extracting the aluminum phosphate values in this residue. A cheap source of iron sulfate is the waste pickling liquor.

The compositions herein considered have been directed to the trivalent metal phosphates and the di and mono-valent metal phosphates have not been discussed. These latter phosphatic materials form tacky solutions in certain instances such as zinc phosphate in phosphoric acid. The efficacy of these materials is less definite and their principal application resides merely in their use as modifying agents for the trivalent metal phosphate solutions.

The binder compositions disclosed herein are applicable in the adsorbent field. They may be employed to bond such adsorbents as bauxite or aluminum hydrate, fuller's earth, activated carbon, silica gel, magnesium oxide and magnesium silicate. However, their uses are not limited solely to binding in the sense that they may be used only to bond or cement solid particles into a coherent mass. Experiments indicate that they may be employed as tacky solutions to modify clays; for example, to improve the plasticity and green strength of ceramic bodies. The aluminum phosphate binders after dehydration at elevated temperatures have an excellent refractoriness and thermal stability. The presence of lime, silica and other substances may alter these properties and obviously during firing the bond may be made to flux with the body of the ceramic mass, and thus form a homogeneous ceramic material of either a glass or porcelain type.

The binders in each of the foregoing groups meet each of the following requirements for commercial binders or cements.

1. They are available in liquid as well as solid form.
2. The solid form permits ready transformation into the liquid form by the addition of water or other suitable solvent.
3. The binder in liquid state does not form dilatant muds with minerals such as asbestos, feldspar, etc. This is in some instances the case with sodium silicate solutions.
4. The binder permits, within limits, a control of its degree of acidity.
5. It permits dilution to any desirable extent without precipitation of solid matter by reaction with water and also permits concentration by heating without decomposition.
6. At a specified water content the binder has a definite viscosity and definite reproducible adhesive properties. The manufacturing process is simple and flexible.

I claim:

A method of preparing a mineral binder comprising forming a homogeneous dry mixture of aluminum sulphate capable of liquefying in its water of crystallization calcium phosphate and an insolubilizing basic compound selected from the group consisting of barium carbonate and lead oxide capable of reacting with the metal salt in a molten condition and thereafter submitting the dry mixture to heat and pressure to liquefy the aluminum sulphate and react the calcium phosphate and insolubilizing compound therewith.

HERBERT H. GREGER.

REFERENCES CITED

The following references are of record in the file of this patent:

UNITED STATES PATENTS

| Number | Name | Date |
|---|---|---|
| 771,184 | Steenbock | Sept. 27, 1904 |
| 923,238 | Ames | June 1, 1909 |
| 1,081,573 | Boeck | Dec. 16, 1913 |
| 1,310,901 | Andresen | July 22, 1919 |
| 1,578,812 | Dawes et al. | Mar. 30, 1926 |
| 1,886,982 | Simon | Nov. 8, 1932 |
| 2,007,052 | Howe | July 2, 1935 |
| 2,035,140 | Brill | Mar. 24, 1936 |

FOREIGN PATENTS

| Number | Country | Date |
|---|---|---|
| 4,954 | Great Britain | 1883 |
| 8,314 | Great Britain | 1896 |
| 233,907 | Great Britain | May 21, 1925 |
| 521,694 | Great Britain | May 29, 1940 |